US007949765B2

(12) United States Patent
Tsyganskiy (10) Patent No.: US 7,949,765 B2
(45) Date of Patent: May 24, 2011

(54) DATA STRUCTURE FOR ANALYZING USER SESSIONS

(75) Inventor: Igor Tsyganskiy, Los Gatos, CA (US)

(73) Assignee: SAP Aktiengesellschaft, Walldorf (DE)

( * ) Notice: Subject to any disclaimer, the term of this patent is extended or adjusted under 35 U.S.C. 154(b) by 2726 days.

(21) Appl. No.: 10/307,906

(22) Filed: Dec. 2, 2002

(65) Prior Publication Data

US 2004/0107243 A1    Jun. 3, 2004

(51) Int. Cl.
*G06F 13/00* (2006.01)
(52) U.S. Cl. .................. 709/228; 709/203; 709/224
(58) Field of Classification Search .................. 709/224, 709/223, 203, 228
See application file for complete search history.

(56) References Cited

U.S. PATENT DOCUMENTS

| | | | | |
|---|---|---|---|---|
| 5,796,952 | A * | 8/1998 | Davis et al. .................. | 709/224 |
| 5,999,975 | A | 12/1999 | Kittaka et al. | |
| 6,112,238 | A * | 8/2000 | Boyd et al. .................. | 709/224 |
| 6,182,066 | B1 | 1/2001 | Marques | |
| 6,286,030 | B1 | 9/2001 | Wenig et al. | |
| 6,295,559 | B1 | 9/2001 | Emens et al. | |
| 6,502,131 | B1 * | 12/2002 | Vaid et al. .................. | 709/224 |
| 6,988,109 | B2 * | 1/2006 | Stanley et al. ................ | 1/1 |
| 2002/0063735 | A1 * | 5/2002 | Tamir et al. .................. | 345/745 |
| 2002/0156756 | A1 | 10/2002 | Stanley | |
| 2003/0204581 | A1 * | 10/2003 | Adar et al. .................. | 709/223 |

OTHER PUBLICATIONS

International Search Report, International Application No. PCT/IB03/06401, Jun. 25, 2004, pp. 1-2.
Official Action issued in corresponding German Application No. 10393809.5-53; Jan. 21, 2008; 4 pages.

* cited by examiner

*Primary Examiner* — Kenneth R Coulter
(74) *Attorney, Agent, or Firm* — Fish & Richardson P.C.

(57) ABSTRACT

Methods and apparatus, including computer program products, for providing a data structure for analyzing user sessions. A computer-implemented method, for processing information exchanged between a client and server, includes receiving information characterizing requests and responses exchanged between a client and a server. The method includes extracting field names and field values from the information. The method includes, for each hit, creating a name-value element for each field of the display page of the hit. Each name-value element includes a field name of the corresponding field and all the field values of the field found in the request and the one or more responses of the hit. The method includes creating, for each hit, a vector of the name-value elements created for the hit. The method includes, if the requests and responses include multiple hits, specifying an order of the vectors of the respective hits to define a sequence of vectors.

25 Claims, 5 Drawing Sheets

DATA STRUCTURE FOR ANALYZING USER SESSIONS

BACKGROUND OF THE INVENTION

The present invention relates to data processing, and more particularly to analyzing user sessions of network applications.

A network such as the Internet usually includes client computers ("clients") and server computers ("servers"). A client and server are generally remote from each other and typically communicate through connections of the network. The relationship of client and server arises by virtue of computer programs running on the respective computers and having a client-server relationship to each other.

Computer programs that run in a network environment are generally referred to as network applications. A network application can run on either a client, a server, or both a client and a server. One example of a network application is a Web browser, or, simply, a browser. A browser is a program that runs on a client and uses Hypertext Transfer Protocol ("HTTP") or Secure Hypertext Transfer Protocol ("S-HTTP") to exchange information with servers. Another example of a network application is an enterprise application hosted by a server. The enterprise application provides information or performs some function in response to interaction with one or more clients.

In running a network application, a client usually requests information from a server. In response to each request, the server usually provides information to the client. A client being operated by a human operator can, for example, use a browser to access a Web page of a site hosted by a server. In response to input from the human operator, the client usually sends a request for the Web page to the server. In response to the request, the server accesses the requested Web page and sends a response that includes the requested page. When the client receives the response from the server, the client can display the Web page for the human operator to view. In response to further input from the human operator, the client can send another request to the server.

The information exchanged between a server and a client usually includes field names and field values. When the Web page includes one or more fields, for example, the request and response can each include field names and field values of the fields.

In general, a particular set of communications between a server and a client will be referred to in this specification as a user session. The set can be defined in different ways. A user session generally includes a series of request sent by a client to a server, and a series of responses sent from the server to the client in response to the requests. Generally, requests and responses of a user session are prompted by some human interaction but need not be so.

Some user sessions can use a disconnected protocol. That is, the client and server are not in active communication after the server responds to a particular request from the client. They are disconnected after each pair of request and corresponding response. The client must establish a new connection with the server after each hit. HTTP/1.0 is one example of a disconnected protocol.

SUMMARY

The present invention provides data structures and techniques for analyzing user sessions.

In general, in one aspect, a computer-implemented method, for processing information exchanged between a client and a server, includes receiving information characterizing requests and responses exchanged between a client and a server. The requests and responses include at least one hit. Each hit includes one or more responses that collectively specify a display page presented to a user. The one or more responses include all fields of the display page. Each hit further includes a request sent to the server that corresponds to the responses of the hit. The request optionally includes fields. All the fields of the request are fields of the display page. The method includes extracting field names and field values from the information characterizing the requests and responses. The method includes, for each hit, creating a name-value element for each field of the display page of the hit. Each name-value element includes a field name of the corresponding field and all the field values of the field found in the request and the one or more responses of the hit. The method includes creating, for each hit, a vector of the name-value elements created for the hit. The method includes, if the requests and responses include multiple hits, specifying an order of the vectors of the respective hits to define a sequence of vectors.

In general, in another aspect, a computer program product, for processing information, includes instructions operable to cause a programmable processor to receive information characterizing request and responses exchanged between a client and a server. The requests and responses include at least one hit, wherein each hit includes one or more responses that collectively specify a display page presented to a user, the responses including all fields of the display page, and wherein each hit further includes a request sent to the server that corresponds to the responses of the hit. The request optionally includes fields, the fields of the request all being fields of the display page. The product includes instructions to extract field names and field values from the information characterizing the requests and responses. The product includes instructions to create, for each hit, a name-value element for each field of the display page of the hit. Each name-value element includes a field name of the corresponding field and all the field values of the field found in the request and the one or more responses of the hit. The product includes instructions to create, for each hit, a vector of the name-value elements created for the hit. The product includes instruction to specify, if the requests and responses include multiple hits, an order of the vectors of the respective hits to define a sequence of vectors. The product is tangibly stored on a computer-readable medium.

The invention can be implemented to realize one or more of the following advantages. The data structure described in this specification facilitates analysis of multiple aspects of a user session. The same set of data can be used for different analyses. For example, a same set of data arranged into the data structure can be analyzed for page specific patterns and field specific patterns. There is no need to store multiple structures of the collected data. The data structure can be easily and quickly changed. For example, when the data structure is a multidimensional matrix, a simple transformation can change the data structure into a form appropriate for a particular analysis. When arranged into the data structure, data collected from a first user session can be compared to data collected from other user sessions. When user sessions involve retrieval of Web pages from a Web site, data collected from a first user session can be compared to data collected from a second user session, even when the structure of the Web site has been altered between the first and second user sessions.

The details of one or more embodiments of the invention are set forth in the accompanying drawings and the descrip-

BRIEF DESCRIPTION OF THE DRAWINGS

Like reference numbers and designations in the various drawings indicate like elements.

DETAILED DESCRIPTION

Figure 1:
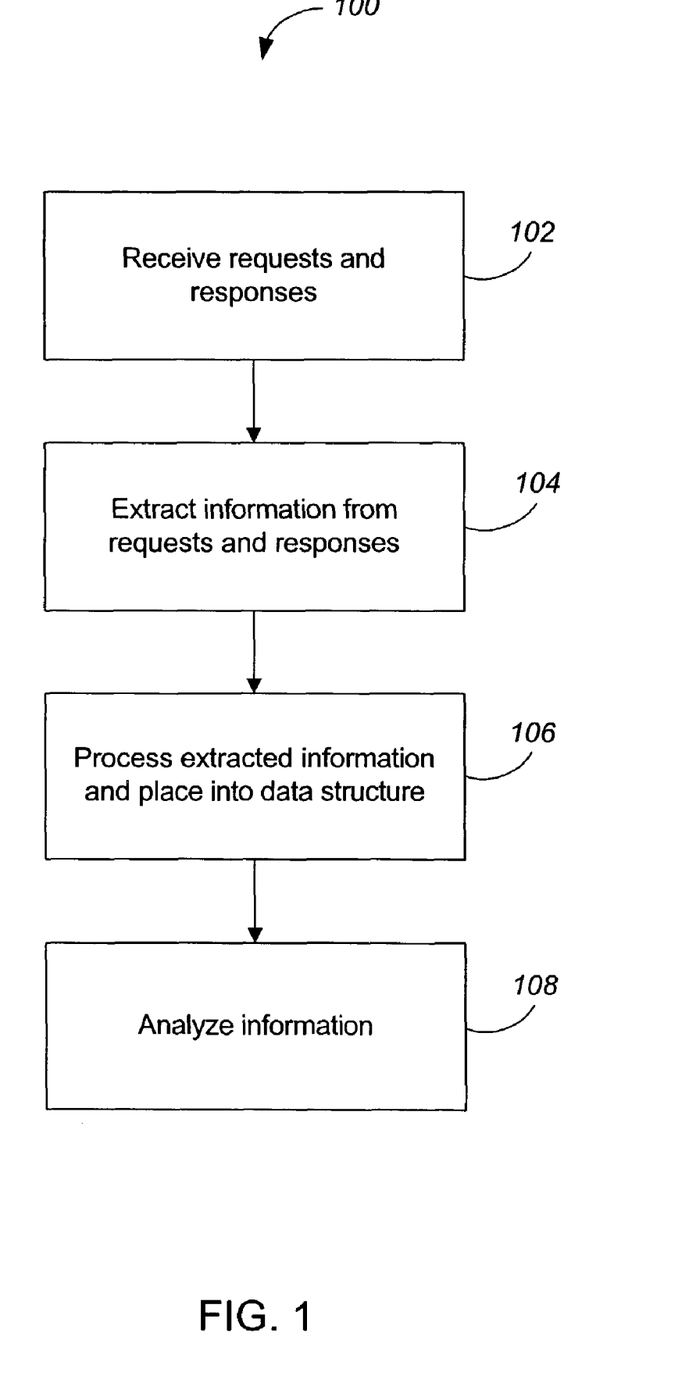
FIG. 1 shows a method for analyzing a user session of a network application.

As shown in FIG. 1, a system performing method 100 receives requests and responses (step 102). At least one of the requests or at least one of the responses includes one or more fields. The requests and responses can be those exchanged between a client and server connected by a network, one example of which is the Internet. The client and server can use HTTP to communicate. The requests and responses can include content that is expressed in a page description language or a markup language, e.g., hypertext markup language ("HTML"), extensible markup language ("XML"), standardize general markup language ("SGML"), or in any combination of them. The requests and responses can include content express in any other language that includes information of the kind normally included in HTML tags.

The requests and responses are exchanged during a user session of a network application. A user session can be identified based on an HTTP session model. A session can start and end, for example, upon an issuance of a server cookie and a closure of a browser instance, respectively. A user session can also be identified by the network application itself. For example, a network application can include a login and logout function that starts and terminates, respectively, a user session. In general, a user session is a "delimited set of user clicks across one or more Web servers" (definition of the World Wide Web Consortium (W3C) in Web Characterization Terminology & Definitions Sheet, W3C Working Draft 24-May-1999).

The system can receive the requests and responses from client or server or both during the user session, or it can receive recorded requests and responses later from a log or other memory.

The system extracts information from the requests and responses (step 104). The system parses the requests and responses to extract field and page information. Field information includes attributes of the fields such as a field name and a corresponding field value. Other information extracted can include the time the request or response was sent. Receiving and extracting field information are further described in commonly owned U.S. Pat. No. 6,286,030, which is hereby incorporated by reference in its entirety.

The system processes the extracted information and places the processed information into a data structure (step 106). Processing can include, for example, grouping, comparing, and updating the information. In particular, the system extracts and organizes field information from the requests and responses. For this reason, the data structure in which the extracted information is stored will be referred to generically as a field vector table, although in any particular implementation the field information need not be organized in vector (one-dimensional array) form and the data structure as a whole need not be organized in a multi-dimensional array form; other data structures can be used. However, as will be seen, the use of arrays to organize the data does have discernable advantages.

Field information can be grouped by hits. A hit can be defined to include one or more responses and a request. The one or more responses specify a Web page and the request is sent by a client in response to a user interacting with the Web page. A Web page can be specified by a single response or multiple responses. In the latter case, each response can specify a different portion and include different fields of the Web page. Each response can also have content expressed in a different markup language. Alternatively, a hit can be defined to include a request for a Web page and one or more responses that specify the Web page.

Comparing information can include, for example, comparing the field values included in the one or more responses of a hit with the field values included in the request of the hit. By performing such a comparison, the system can, for example, identify the fields that are used, changed, or used and changed. Optionally, the system can derive other information from the extracted information.

Updating the information can include, for example, adding derived information to the field information. Processing can alternatively include other operations, including substituting field names with aliases.

As mentioned above, the system can arrange the field information in a two-dimensional array or matrix. The matrix can include groups of field information, arranged as a sequence. The rows of the matrix can, for example, represent a hit. Each row can include fields information extracted from the one or more responses and the request of the hit. Each row can furthermore include information that the system derived by processing the extracted information. The hits can be ordered by chronological order. Alternatively, the data structure can be a matrix of arrays, in which matrix each array includes field information of a hit.

The system analyzes the information (step 108). Analysis can include a page specific analysis, a field specific analysis, or any combination of both. Analysis can further include statistical analyses such as clusterization, association, and filtration.

The data structure can be changed to facilitate each type of analysis. For example, when the data structure is a matrix, any database operation can be applied to the matrix. Database operations can include, by way of example, index, sort, group by, join, cluster, and order. When there is more than one user session, a field vector table of one user session can be compared to a field vector table of another user session. Field vector tables can furthermore be combined and the combination can be compared with other field vector tables or other combinations.

Figure 2:
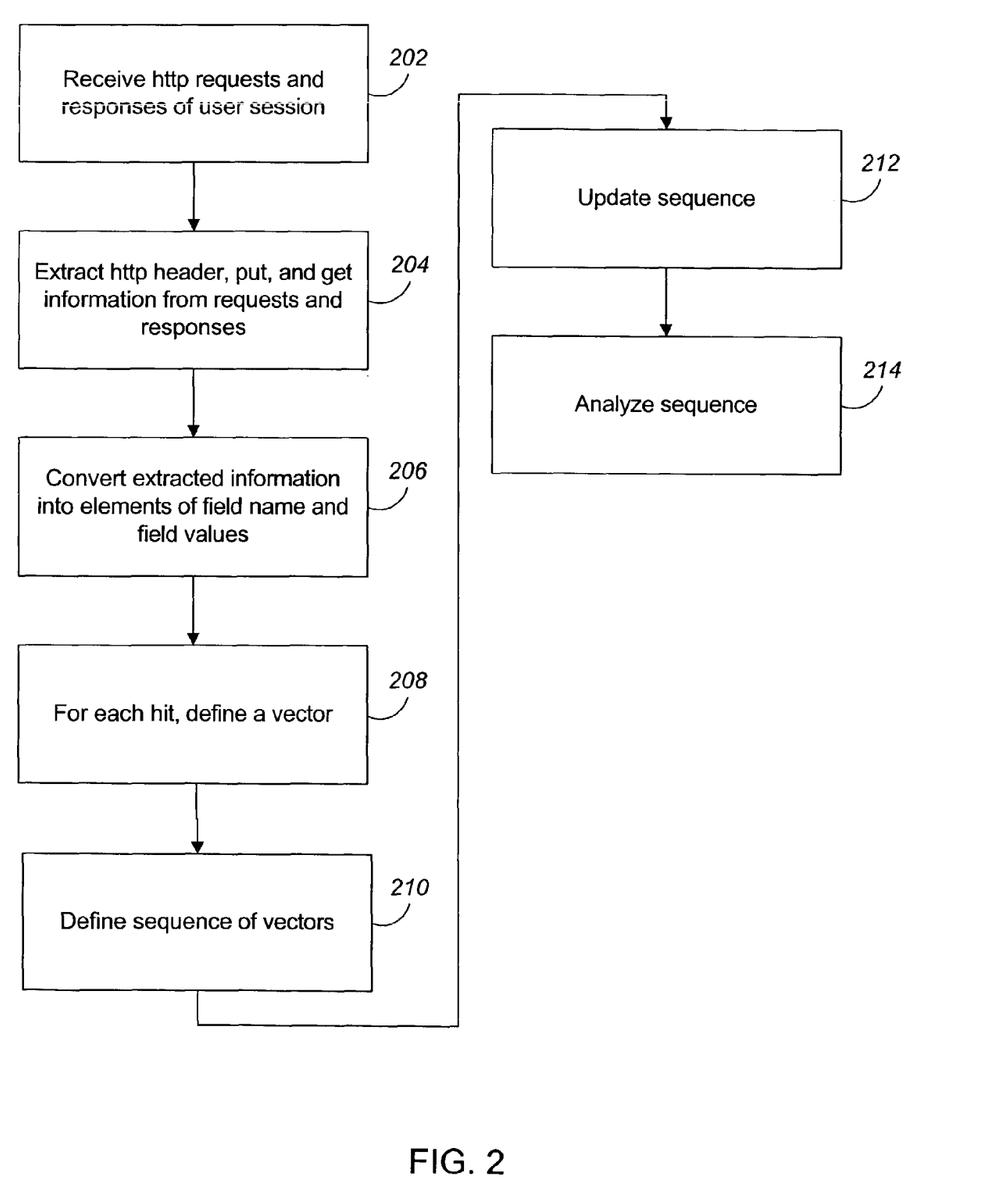
FIG. 2 shows an implementation of the method of FIG. 1.

As shown in FIG. 2, a system performing a method 200 receives HTTP requests and responses of a user session of a network application (step 202). The system can receive the requests and responses during the user session or, alternatively, after the user session. The system can use any or a variety of known techniques to identify and distinguish user sessions. The system can, for example, use a session cookie to identify requests and responses as being part of a user session. The session cookie includes a globally unique identifier ("GUID") that identifies the user session. The session cookie expires when the browser being used is closed. Alternatively, the system can use a GUID that is included in uniform resource locators ("URLs") included in Web pages sent to the user. The GUID changes when the user session ends. In this case, the network applications determines when the user session starts and ends. Furthermore, if HTTP/1.1 persistent connections are used, these can also be used to identify user sessions.

The requests and responses are exchanged between a client and server connected by a network such as the Internet. A human user operating the client accesses the network application through a dynamically generated screen. Based on information provided by the human user, which information are included in the requests, the server provides information to update the dynamically generated screen. In one implementation, the dynamically generated screen is rendered by the client based on information included in responses from the server. The response can include material represented in a markup language such as HTML, XML, and SGML. Alternatively, the response can include information that is represented in formats compatible with dedicated online environments such as an SAP R/3 environment.

The system extracts HTTP header information, put information, and get information from the received requests and responses (step 204), or equivalent information if other client-server protocols are used. The system parses the requests and responses to locate and extract the described information.

The system converts the extracted information into pairs of field names and field values (step 206). A field representing, for example, a user name can have a field name of "u_name" and a field value of "John Smith". The pair for this field would be: (u_name, John Smith).

For each hit, the system defines a vector of field information that was included in the one or more responses and the request of the hit (step 208). This can be implemented as a one-dimensional array of name-value elements that optionally carries further information, as will be described. The one or more responses describes an entire Web page and includes all fields of the Web page. The request of the hit may include one or more fields of the Web page. For each field, the system groups into a name-value element the field name, the field value as indicated by the one or more responses, and the field value as indicated by the request. The system groups the name-value elements of the hit into a vector. The vector can include a page name of the Web page. The vector can include other information, such as the GUID for the user session and a unique identifier for the human user. Each of these further kinds of information can be stored as name-value pairs.

Optionally, the page name in the vector can be an alias. By using aliases, the system can compare the use of the page during one user session with the use of the page during another user session, even when the page name of the Web page has been changed. A table can be used to map the different page names to the same alias.

Field names in a vector can also be aliases, and a table can be used to map aliases to field names. As with page names, using aliases for field names allows the system to compare fields even when the field names has been changed. Generally, it will be the task of a human user to determine when the Web pages having different page names are the same Web page and when fields having different names are the same field.

The system defines an ordering of the vectors, i.e., a sequence (step 210). The vectors can be ordered, for example, according to the time when a request was sent. Alternatively, the vectors can be ordered based on other attributes that indicate order in which the hits occurred. For later processing, it can be advantageous to arrange the vectors physically in computer memory in sequence.

The sequence of vectors can be stored as a two-dimensional array in which the rows or columns can each represent a hit.

The system updates the sequence of vectors (step 212). Updating can include deriving information and then adding the derived information to the vectors. The system can add the derived information in additional dimensions of an array in which the vectors are stored.

Figure 3:
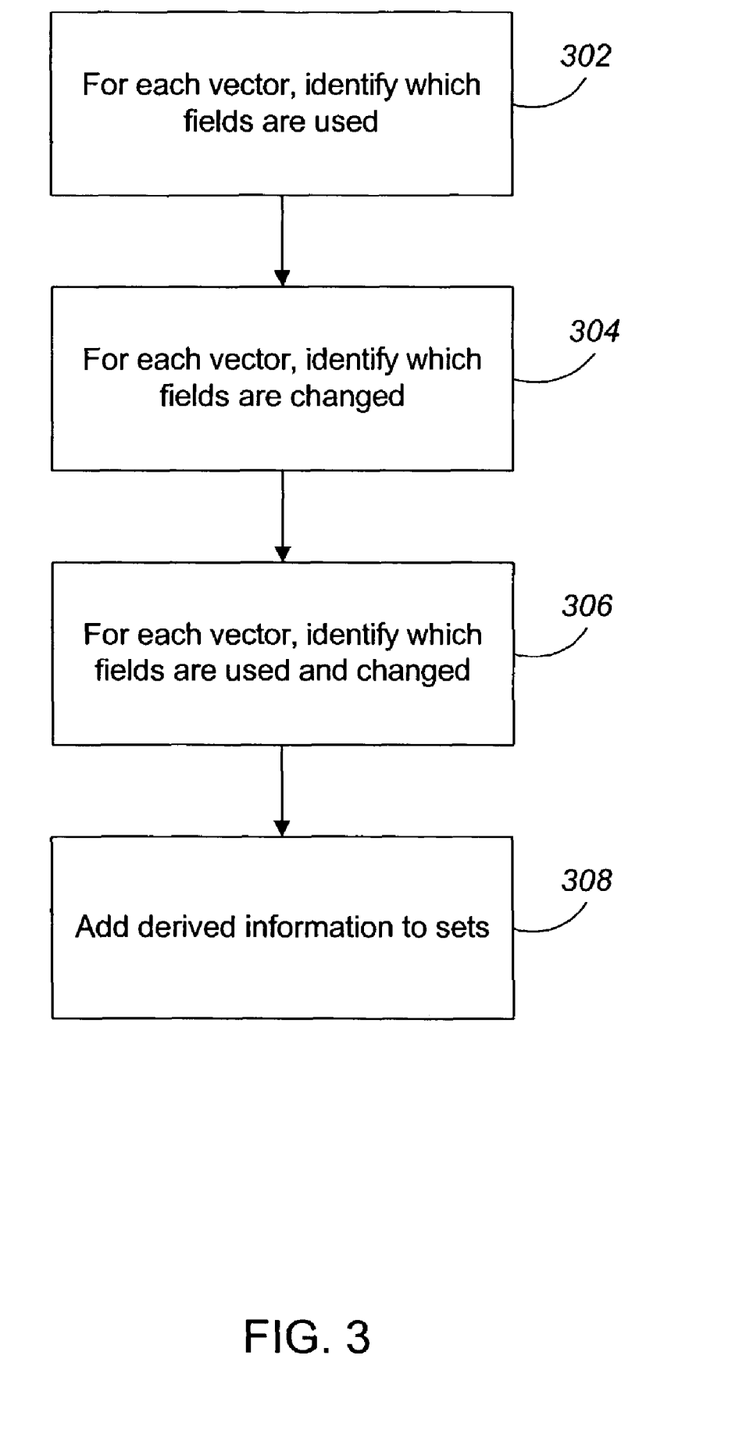
FIG. 3 shows a method for updating a matrix.

FIG. 3 shows how the system updates the sequence of vectors in one implementation. The system identifies, for each vector, which represents a hit, the fields of the Web page that are used in the request of the hit (step 302). One way of identifying such fields is to determine whether the field value of the request is null. If it is, then the field has not been used. If it is not, then the field has been used. For example, in a name-value element in which field name=u_name; field_value_response=null; and field_value_request=John Smith, the system can determine that the field named u_name has been used in the request of the hit. Another way of determining whether a field is used is to check for a deletion of the field value. If the field value in the field has been deleted, then the field is not used. If the field value has not been deleted and is either the same or has been changed, then the field is used. An example of a deletion is the following field-value element: field-name=u_name; field-value response=John Smith; and field-value request=null.

The system can interpret any value of a field to be a null. The system can interpret as a null, for example, all blank spaces in a word-string field and all zeros in a number-string field. In general, the system can define an absence of input or any field value as a null.

The system identifies, for each vector, the fields of the Web page that have been changed by the request of the hit (step 304). One way of identifying such fields is to compare the fields value of a response with the field value of a request. If the field values are different, then the field has been changed. Otherwise, the filed has not been changed. Given the name-value element described above, the field values have changed from null to John Smith. The field is, hence, one that has been changed.

The system identifies, for each vector, fields of the Web page that have been used and changed (step 306). A field can be used but not changed. For example, a field can have a default value so that the field is used in the request. When the default value is not changed, the field is still used but has not been changed. The system can use the techniques described to identify fields that are used and changed.

Alternatively, other information can be derived by the system by processing the sequence of vectors. For example, the system can derive statistical information calculated from information included in the sequence of vectors.

Figure 4:
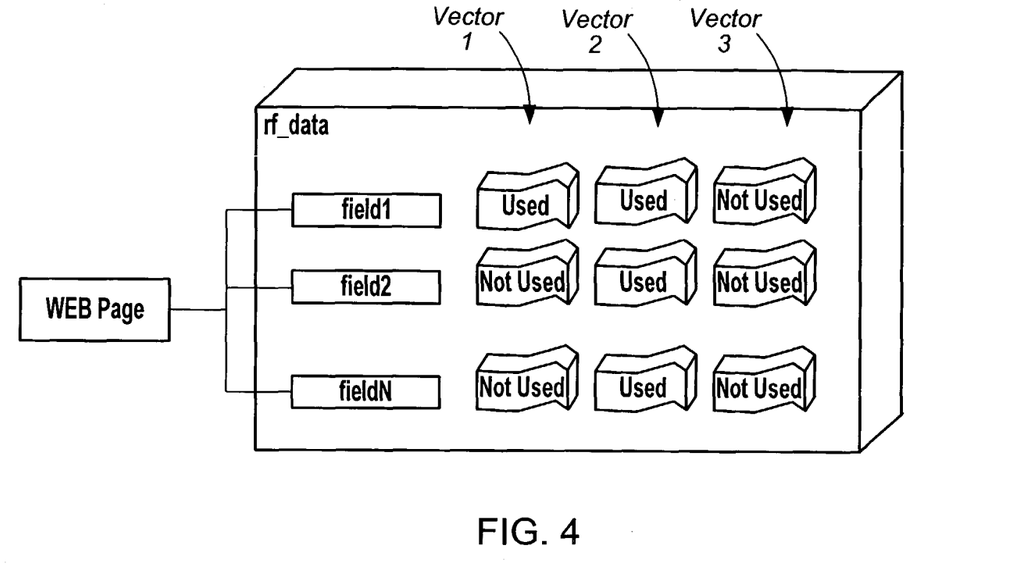
FIG. 4. shows an example of an updated matrix.

The system adds the derived information to the name-value elements (step 308). In one implementation, the system can add the derived information by adding additional dimensions to the data structure. FIG. 4 shows an example of the updated sequence of vectors.

The system can now use the updated sequence of vectors in its analysis of the user session (step 214 of FIG. 2). If the data is stored in a multi-dimensional array as has been described, this can be transformed to facilitate the analysis. The system can include software to perform one or more of various kinds of analysis, for example, sequence analysis, page field analysis, and path field analysis, which can be performed using various statistical techniques.

Figure 5:
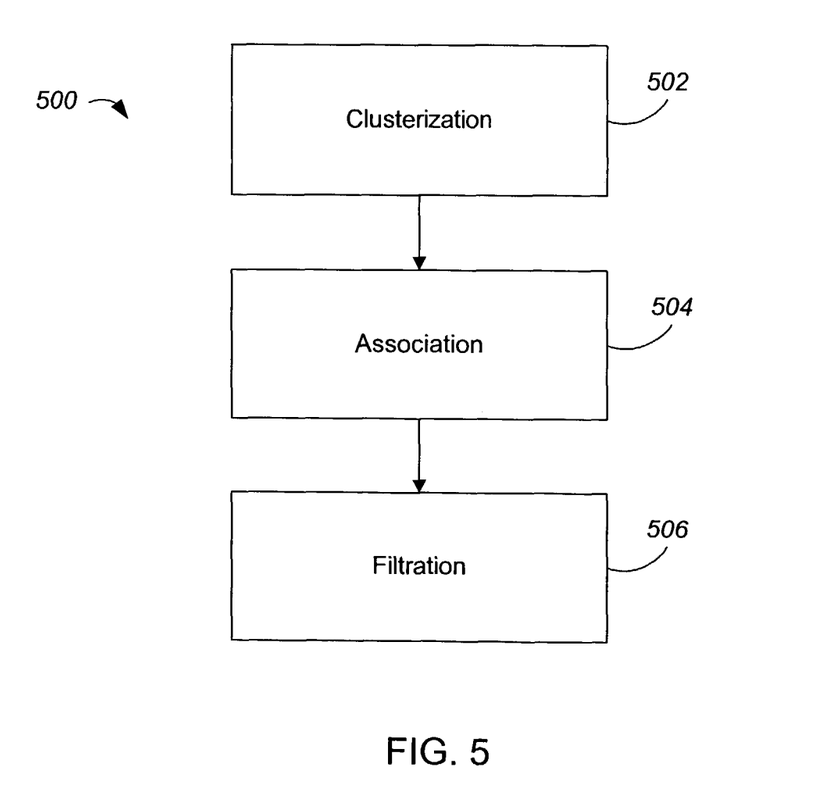
FIG. 5 shows a method for analyzing the updated matrix.

FIG. 5 shows an example method 500 for analyzing a user session. As shown, the system performs a clusterization analysis (step 502), an association analysis (step 504), and a filtration analysis (step 506). Optionally, any of these analyses can be omitted and these analyses can be performed in any order and combination. Clusterization analysis is generally classification without appropriate information and can be basic or include median and PAM (partitioning around medoids) clusterization.

Figure 6:
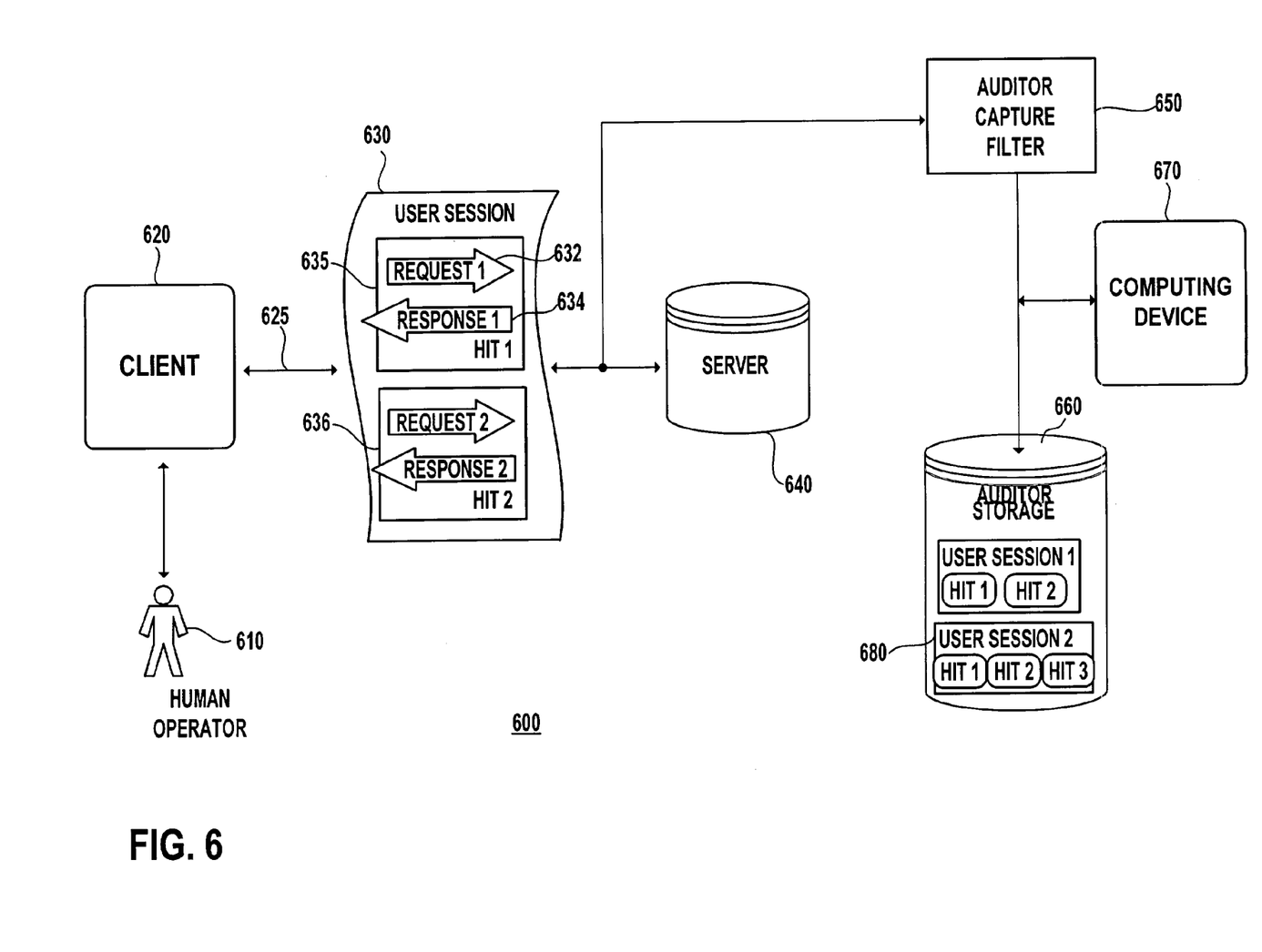
FIG. 6 shows an example of a computer system in which user sessions can be analyzed as described herein.

FIG. 6 shows an example of a computer system in which a user session can be analyzed as described herein. The system includes a client 620 and a server 640. A human user 610 accesses a network application that resides on the server 640 in a user session 630 that includes a first hit 635 and a second hit 636. Each hit includes a request and one or more responses that describe a Web page. For example, the first hit 635 includes a request 632 and a response 634. The responses and request are exchanged over network connection 625. An auditor capture filter 650 captures the user session 630 and stores the session in an auditor storage 660. The auditor storage 660 can include data from other user sessions such as, for example, user session 680. A computing device 670 includes computer programs for extracting and arranging data as described herein. As discussed the computing device can perform these operations during the user session or after the user session. In the former case, the computing device can receive data from the auditor capture filter 650. In the latter case, the computing device can received data from the auditor storage 560. Optionally, the computer device can include computer programs for analyzing the captures data as described herein.

In one implementation, the system described above is used to analyze user sessions of a network application for selling products, such as, for example, configurable products like computers and automobiles. The network application provides a Web site that describes the configurable product. Human operators can, by accessing the Web site, interact with the network application to, for example, configure the product, get pricing information, purchase an instance of the configurable product, and track purchase orders.

The Web pages of the Web site can include, for example, fields for indicating information about the human user. Name, address, and credit information are examples of such information. The field values for these fields are generally alpha-numeric strings. Some of the fields can be implemented as a pull down menu. For example, the field indicating a state of residence can be implemented as a pull down menu that lists all fifty states.

The Web pages can also include fields for describing the configurable product. In the case when the configurable product is a desktop computer, the fields can indicate, for example, processor type, non-persistent memory type and size, video card type, hard drive type and size, monitor type and size, keyboard type, as well as other hardware and software options. The field values for these fields can be implemented, for example, as alpha-numeric strings, pull down menus, check boxes, or any combination of these.

Implementing the above described methods and system can provide useful feedback about the user sessions of the example network application. Analysis can, for example, provide information about which configuration of the configurable product is most commonly purchased, the percentage of users sessions that result in a purchase, and so forth. Analysis can further provide, for example, information about the use of the Web site. This information can include which fields or Web pages are most commonly used, which fields or Web pages are least used, and which fields are commonly used for a given Web page.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, or embodied in a propagated signal, or embodied in any combination of the machine-readable storage device and the propagated signal. Method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. A hit can be defined to include a request for a Web page and, furthermore, one or more responses that described the Web page requested. The methods and system described can be applied to any network application, and is not limited to those shown as examples.

What is claimed is:

1. A computer-implemented method comprising:
  receiving information characterizing a hit, wherein the hit includes a request and one or more responses related to the request, and wherein the response or responses include all fields of a display page;
  extracting all field names and all field values from the information characterizing the hit; and
  creating a name-value element for each field of the display page wherein the name-value element includes a field name and all field values of the field.

2. The method of claim 1, further comprising:
  creating a vector of the name-value elements, wherein a vector is a one-dimensional array; and
  specifying an order of the vectors.

3. A computer-implemented method for processing information exchanged between a client and a server, the method comprising:
  receiving information characterizing requests and responses exchanged between a client and a server, the requests and responses including at least one hit, wherein each hit includes one or more responses that collectively specify a display page presented to a user, the responses including all fields of the display page, and wherein each hit further includes a request sent to the server that corresponds to the responses of the hit, the request optionally including fields, the fields of the request all being fields of the display page;

extracting field names and field values from the information characterizing the requests and responses;

for each hit, creating a name-value element for each field of the display page of the hit, each name-value element including a field name of the corresponding field and all the field values of the field found in the request and the one or more responses of the hit, and creating for each hit a vector of the name-value elements created for the hit; and, if the requests and responses include multiple hits, specifying an order of the vectors of the respective hits to define a sequence of vectors.

4. The method of claim 3, wherein:
the display page is a Web page.

5. The method of claim 3, further comprising:
for each vector, identifying which fields have been used, changed, or used and changed.

6. The method of claim 5, further comprising:
adding information to each vector to indicate whether a field has been used, changed, or used and changed.

7. The method of claim 3, wherein:
receiving information characterizing requests and responses includes receiving information characterizing requests and responses sent during a first user session.

8. The method of claim 7 further comprising:
comparing the first sequence of vectors with a second sequence of vectors that includes information from a second user session.

9. The method of claim 8, further comprising:
assigning an alias to a field having different field names at different times.

10. The method of claim 3, wherein the first sequence of vectors is stored as a two-dimensional array, the method further comprising:
performing a database operation on the array.

11. The method of claim 10, further comprising:
analyzing information in the array.

12. The method of claim 3, further comprising:
extracting a page name of a display page from the information characterizing the requests and responses; and
including the page name in a vector that includes field information from the display page.

13. A computer program product, stored on a non-transitory computer-readable medium, for processing information, the product comprising instructions operable to cause a programmable processor to:

receive information characterizing requests and responses exchanged between a client and a server, the requests and responses including at least one hit, wherein each hit includes one or more responses that collectively specify a display page presented to a user, the responses including all fields of the display page, and wherein each hit further includes a request sent to the server that corresponds to the responses of the hit, the request optionally including fields, the fields of the request all being fields of the display page;

extract field names and field values from the information characterizing the requests and responses;

for each hit, create a name-value element for each field of the display page of the hit, each name-value element including a field name of the corresponding field and all the field values of the field found in the request and the one or more responses of the hit, and creating for each hit a vector of the name-value elements created for the hit; and, if the requests and responses include multiple hits, specify an order of the vectors of the respective hits to define a sequence of vectors.

14. The product of claim 13, further comprising instructions to:
determine whether a field has been changed.

15. The product of claim 14, further comprising instructions to:
compare field values of a name-value element to determine whether a field has been changed.

16. The product of claim 13, further comprising instructions to:
determine whether a field has been used.

17. The product of claim 16, further comprising instructions to:
compare field values of a name-value element to determine whether a field has been used.

18. The product of claim 13, further comprising instructions to:
store the vectors as a multi-dimensional array.

19. The product of claim 18, further comprising instructions to:
perforin a database operation on the multi-dimensional array.

20. The product of claim 18, further comprising instructions to:
analyze information in the multi-dimensional array.

21. The product of claim 20, wherein:
analyzing includes comparing the information in the multi-dimensional array with information in a second multi-dimensional array that was created from a second user session.

22. The product of claim 13, further comprising instructions to:
assign an alias to a field having different field names at different times.

23. The product of claim 13, further comprising instructions to:
capture requests and responses during the user session.

24. The product of claim 13, further comprising instructions to:
retrieve requests and responses from memory.

25. The product of claim 13, further comprising instructions to:
extract a page name of a display page from the information characterizing the requests and responses; and
include the page name in a vector that includes field information from the display page.

* * * * *